United States Patent

[11] 3,624,477

[72] Inventors Willis E. Rieman
 Skaneateles;
 John J. Beck, Seneca Falls; Edward R.
 Betz, Auburn, all of N.Y.
[21] Appl. No. 879,236
[22] Filed Nov. 24, 1969
[45] Patented Nov. 30, 1971
[73] Assignee Gulf & Western Systems Company
 New York, N.Y.

[54] INTERMITTENT CONTROL WITH A NORMALLY OPEN THERMAL SWITCH FOR WINDSHIELD WIPER SYSTEM
12 Claims, 2 Drawing Figs.

[52] U.S. Cl. .................................................. 318/443, 318/472
[51] Int. Cl. ........................................................ B60s 1/08
[50] Field of Search ............................................ 318/443 WW, 471, 472, 473; 15/250.02, 250.12

[56] References Cited
UNITED STATES PATENTS
3,148,399 9/1964 Ziegler .......................... 15/250.02
3,487,492 1/1970 Bischoff ........................ 318/443 X FOREIGN PATENTS
1,050,338 12/1966 Great Britain ................ 15/250.12

Primary Examiner—Oris L. Rader
Assistant Examiner—Robert J. Hickey
Attorney—Amster & Rothstein ABSTRACT: An intermittent control for a windshield wiper system. One of the two motor terminals is connected to a battery and the second motor terminal is connected to ground through the conventional park switch. In parallel with the park switch is a bimetal element whose contacts are normally open and are closed as a resistance element heats up. The resistance element is connected in series with a potentiometer between the battery and ground. During each wipe cycle, no current flows through the resistance element and potentiometer, the resistance element cools and the bimetal element contacts open. During each dwell period, current flows through the resistance element and the potentiometer to heat the bimetal element. The dwell period is determined by the setting of the potentiometer. It is also possible to automatically vary the dwell period by including a thermistor in series with the resistance element, the thermistor being heated by an additional resistance element connected in the motor circuit. The drier the windshield, the greater the motor current and the higher the temperature of the additional resistance element. The impedance of the thermistor increases with the temperature of the additional resistance element to increase the dwell period.

PATENTED NOV 30 1971  3,624,477

INVENTORS
WILLIS E. RIEMAN
JOHN J. BECK
EDWARD R. BETZ
BY Amster & Rothstein
ATTORNEYS

INTERMITTENT CONTROL WITH A NORMALLY OPEN THERMAL SWITCH FOR WINDSHIELD WIPER SYSTEM

This invention relates to windshield wiper systems, and more particularly to arrangements for controlling the intermittent operations thereof.

Conventional windshield wiper systems, powered by DC electric motors, cycle continuously at a selected speed until manually switched off. However, there are a number of systems in the prior art which allow the driver to switch from a continuous operation to an intermittent operation in which a dwell period follows each wipe cycle. A dwell period between wipe cycles is advantageous at times when the windshield is only partially wet and the demand for wiping is less than the normal low speed operation. But the prior art intermittent wiper control systems are generally complicated, expensive, and tend to have poor control characteristics.

Some of the prior art systems also provide for an automatic variation of the dwell period—the dwell period increases as the windshield becomes drier. These automatic control systems suffer from the same disadvantages as the manually controlled intermittent dwell systems.

It is a general object of our invention to provide manual and automatic intermittent wiper control systems which are simpler, more reliable, and cheaper than those of the prior art.

Briefly, in accordance with the principles of our invention, a bimetal element is provided for controlling the turning on of the wiper motor. Following any wipe cycle, the bimetal element is in a cooled condition and its contacts are open. Current flows through a heating element associated with the bimetal element and as the element heats up its contacts come closer together. When the contacts engage each other the motor is turned on; the motor then completes its cycle without requiring a connection through the contacts of the bimetal element, and the bimetal element cools in preparation for another heating cycle following the end of the wipe cycle.

The length of the dwell period is determined by the time required for the bimetal element to heat sufficiently to the point where the contacts close. In the manual system, the heating element for the bimetal element is in series with a potentiometer. The magnitude of the current through the heating element, that is, the time required for the contacts to close, is dependent upon the setting of the potentiometer. In the automatic control system, in addition to the potentiometer (which still allows some manual control) the heating element is placed in series with a thermistor. The impedance of the thermistor is determined by the temperature of a resistance element placed in series with the motor winding. The greater the drag on the wiper blades, the greater the motor current and the hotter the resistance element. This in turn increases the thermistor impedance to cause a longer dwell period. Consequently, the dwell period increases as the windshield becomes drier (a dry windshield produces the greatest drag). A second thermistor, also controlled by the temperature of the resistance element, can be placed in series with the motor winding to control the motor speed—the drier the windshield, the slower the motor.

It is a feature of our invention to provide a bimetal element in a circuit for initiating the operation of a windshield wiper motor, the bimetal element determining the dwell period between wiping cycles.

It is another feature of our invention to control the current for heating the bimetal element by varying an impedance, the impedance being varied either by manual operation of a potentiometer or by a thermistor heated by a resistance element connected in the motor circuit.

Further objects, features and advantages of our invention will become apparent upon consideration of the following detailed description in conjunction with the drawing, in which.

Figure 1:
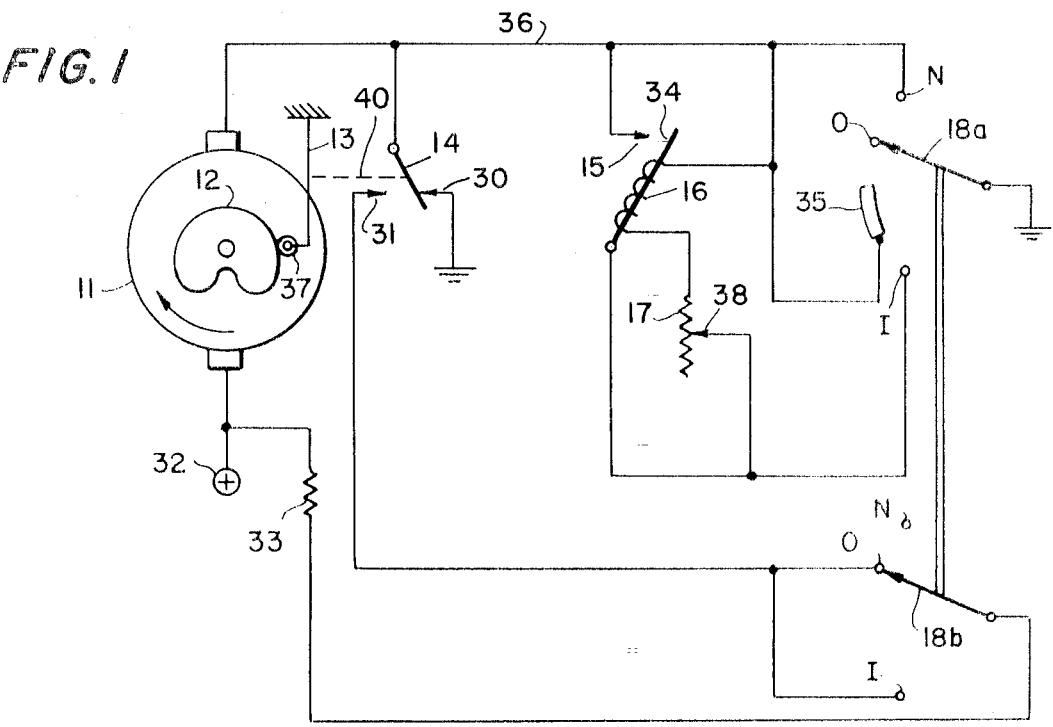
FIG. 1 depicts a first (manual) illustrative embodiment of our invention.

FIG. 1 depicts a conventional DC motor 11 used in a windshield wiper system. Although not shown in the drawing, it is to be understood that the system is provided with a crank arm connected to the output shaft of the motor for powering the windshield wiper linkage. Also, while the system of FIG. 1 is a constant-speed system, it will be apparent to those skilled in the art that the invention is applicable to multiple-speed motors. The invention is applicable to such motors with permanent magnet or wound fields, and to motors with and without depressed park capabilities.

Cam 12 rotates with the output shaft and controls the position of cam follower 37. As the cam follower moves, so does linkage 13. Contact element 14 follows linkage 13 as shown symbolically by dotted line 40. Cam 12 is so arranged that contact 14 engages contact 31 when the wiper blades are in the bottom portion, or park position, of the wipe cycle. Contact element 14 is the conventional park switch of a windshield wiper motor. During the wipe cycle, contact 14 is grounded through contact 30.

For normal, continuous cycling, switch 18a is moved from off (O) position to the normal (N) position. Ground is extended through the switch to conductor 36 connected to one end of the motor circuit. The other end is connected to potential source 32. The system continues to cycle until switch 18a is moved to off (O) position. The motor does not stop immediately because an alternate ground path is provided through contacts 14 and 30. Instead, the motor continues to complete the wipe cycle in progress until contact 14 switches from contact 30 to contact 31 and the ground path is broken.

Switch 18b is ganged with switch 18a. When the two switches are in the normal (N) positions, switch 18b has no effect on the system operation. As soon as the switches are turned off, however, switch 18b is connected to the respective off (O) terminal, contact 31 is extended through switch 18b and resistor 33 to one end of the motor circuit. Initially, this has no effect on the system operation because contacts 31 and 14 are not in engagement. However, at the end of the wipe cycle in progress, contact 14 connects contact 31 to the other end of the motor circuit. At this time resistor 33 is placed across the motor winding. The resistor is only a few ohms in magnitude; the motor winding current flows through the resistor and quickly dissipates. As is known in the art, resistor 33 serves as a brake to cause the motor to come to an abrupt halt.

When it is desired to operate the system in the intermittent mode, switch 18a is moved to the intermittent (I) position. It is desirable to have the wipers come on immediately. Were switch 18a to be moved directly to the intermittent (I) position, a dwell period would precede the first wipe cycle. In order to have the wiper motor turn on immediately, switch 18a passes over "momentary" contact segment 35 as it is moved from the off (O) position to the intermittent (I) position. Ground is extended through switch 18a and the contact segment to conductor 36, connected to one end of the motor circuit. The motor turns on and as soon as cam follower 37 has been forced out of the cam depression, contact 14 engages contact 30 and an alternate ground path is provided for the motor. The time required to move switch 18a past contact segment 35 is sufficient to allow contact 14 to be switched from contact 31 to contact 30.

With switch 18a in the intermittent (I) position, ground is applied to potentiometer tap 38. With contact 14 connected to contact 30, conductor 36 is also at ground potential. Consequently, no current flows from conductor 36 through resistance element 16 and potentiometer 17 because there is no voltage drop across the series circuit. However, as soon as the motor turns off at the end of the wipe cycle, contact 14 no longer engages contact 30 and conductor 36 is no longer grounded. Instead, conductor 36 is connected through two alternate paths to battery 32. One path is through the motor winding and the other is through contacts 14 and 31, switch 18b and resistor 33. The latter path offers minimal resistance and consequently the potential of conductor 36 is essentially that of battery 32. Current flows through resistance element 16, potentiometer 17, tap 38 and switch 18a to ground. As the current flows and the resistance element heats up, the bimetal element moves and contact 34 comes closer to contact 15. Eventually, when the two contacts engage each other, ground potential is extended through switch 18a and the two contacts to conductor 36. The ground potential on conductor 36 once again starts the motor operation, the motor thereafter being held on by engagement of contacts 14 and 30.

With conductor 36 grounded once again, current no longer flows through resistance element 16, the bimetal element cools, and contacts 15 and 34 open as shown in the drawing. (It should be noted that, as shown in the drawing, contact 34 serves as the bimetal element itself and the contact for conducting the motor current at the start of each cycle. As is known in the art, two separate elements may be provided for this purpose—one serving as the contact element and the other being the bimetal element for moving the contact element as it heats up.)

The dwell period is determined by the time required for the bimetal element to heat sufficiently to close the contacts. This is in turn determined by the setting of potentiometer tap 38. The lower the potentiometer setting, the greater the impedance and the less the current through the resistance element. The less the current through the resistance element, the greater the dwell period.

Switch 18b when the intermittent (I) position, connects contact 31 to resistor 33. Resistor 33 serves as a brake resistor following each wipe cycle to bring the motor to an abrupt halt. The brake resistor functions in the same manner both during the intermittent operation and at the end of the last wipe cycle in progress when the system is turned off. It is only when the system is operated in the normal mode, where there is no dwell period, that brake resistor 33 is not connected across the motor winding to brake the motor at the end of each wipe cycle.

Figure 2:
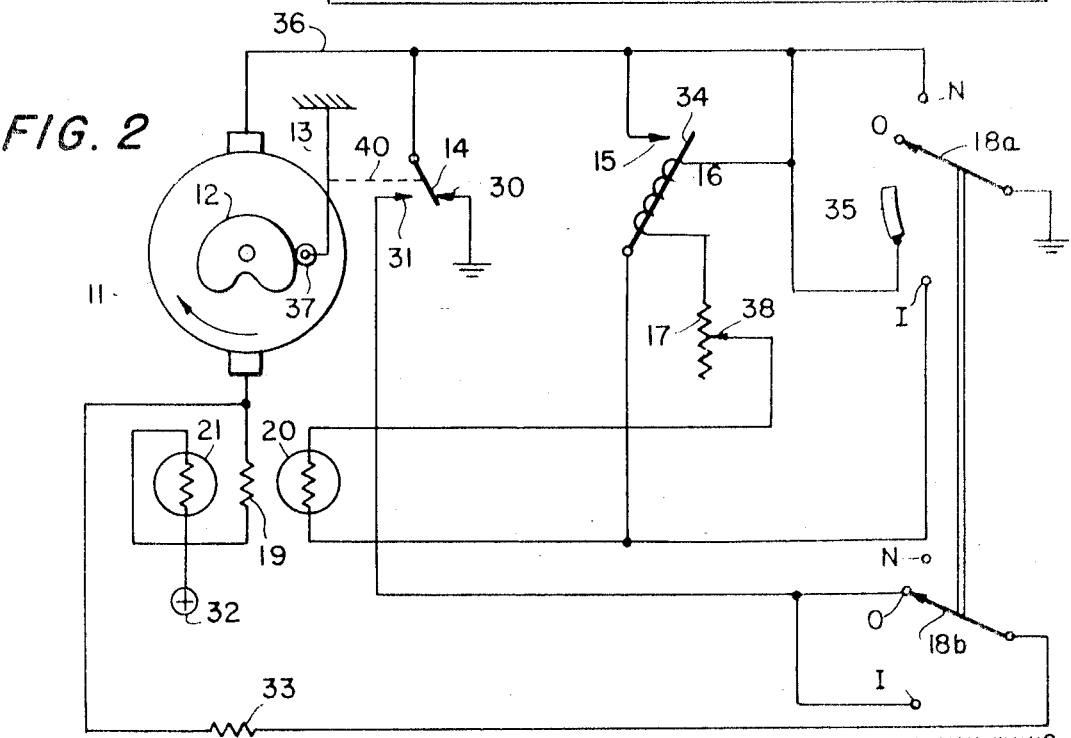
FIG. 2 depicts a second (automatic) illustrative embodiment of our invention.

The system of FIG. 2 is the same as that of FIG. 1, except for the following differences:

a. Resistance element 19 and thermistor 21 are connected in series between battery 32 and the motor winding, and
b. Potentiometer tap 38, instead of being connected directly to the intermittent (I) terminal position for switch 18a, is connected to this terminal position through thermistor 20.

Both thermistors 20 and 21 present impedances which are determined by the temperature of resistance coil 19, the resistance element being heat-coupled to both thermistors. The resistance element is in series with the motor winding. Since its temperature is proportional to the motor current, and the motor current is in turn a function of the drag on the wiper blades, the temperature of the resistance element is a measure of the dryness of the windshield—the drier the windshield, the hotter the resistance element. Thermistor 20 increase impedance as the temperature of resistance element 19 increases. Since thermistor 20 is in series with potentiometer tap 38, it is apparent that the dwell period is determined not only by the setting of the potentiometer tap, but also the impedance of the thermistor. As the windshield becomes drier, the temperature to resistance coil 19 increases and the impedance of thermistor 20 increases. This in turn results in a longer dwell period which is the desired effect; as the windshield becomes drier the frequency of the wiping cycles can be reduced.

It is also desirable to have the motor slow up as the windshield becomes drier since the greatest wiper speed is necessary only when the windshield is wet. As the windshield becomes drier and the temperature of resistance coil 19 increases, the impedance of thermistor 21 similarly increases. Since the thermistor is in series with the motor circuit, a reduced current flows as the impedance of thermistor goes up. This in turn results in a slower motor speed.

Although the invention has been described with reference to particular embodiments, it is to be understood that these embodiments are merely illustrative of the application of the principles of the invention. For example, instead of providing potentiometer 17 to vary the dwell period, the heating current can be held constant and the relative positions of bimetal contact 34 and mating contact 15 can be adjusted. Thus, numerous modifications may be made in the illustrative embodiments of the invention and other arrangements may be devised without departing from the spirit and scope of the invention.

What is claimed is:

1. An intermittent control for windshield wiper system comprising a motor for driving windshield wiper blades through a wipe cycle, said motor including two terminals, first means for connecting a first one of said two terminals to a source of a first potential, and second means for connecting the second one of said two terminals to a source of a second potential, said second connecting means including two parallel paths, a first of said paths including a motor park switch and a second of said paths including a bimetal element and a heater resistance element therefor, said bimetal element having normally open contacts and operative to close following a dwell period after each wipe cycle, the opening of said normally open contacts being dependent on the cooling rate of said bimetal element.

2. An intermittent control for a windshield wiper system in accordance with claim 1 further including manually adjustable means for varying the closure time of said bimetal element.

3. An intermittent control for a windshield wiper system in accordance with claim 2 further including an additional resistance element connected in series with said motor terminals, and a thermistor heat-coupled to said additional resistance element and connected in series with said resistance element.

4. An intermittent control for a windshield wiper system in accordance with claim 3 wherein said manually adjustable means is a variable resistance connected in series with said heater resistance element.

5. An intermittent control for a windshield wiper system in accordance with claim 3 further including an additional thermistor heat-coupled to said additional resistance and element connected in series with said motor terminals for controlling the speed of said motor in accordance with the temperature of said additional resistance element.

6. An intermittent control for a windshield wiper system in accordance with claim 2 wherein said manually adjustable means is a variable resistance connected in series with said heater resistance element.

7. An intermittent control for a windshield wiper system in accordance with claim 3 further including an additional resistance element connected in series with said motor terminals, and a thermistor heat-coupled to said additional resistance element and connected in series with said heater resistance element.

8. An intermittent control for a windshield wiper system in accordance with claim 7 wherein said motor park switch is operative to connect said second motor terminal to said source of said second potential when said motor is out of its park position and further including a brake resistance, said motor park switch being further operative to connect said brake resistance across said switch terminals when said motor is in its park position.

9. An intermittent control for a windshield wiper system in accordance with claim 1 further including switch means having three positions, a first of said positions for deenergizing said motor, the second of said positions for connecting said second motor terminal to said source of said second potential bypassing said second connecting means, and the third of said positions for enabling the operation of said second path connecting means.

10. An intermittent control for a windshield wiper system in accordance with claim 9 further including means operative when said switch means is moved from said first position to said third position for momentarily providing an alternate path from said second motor terminal to said source of said second potential.

11. An intermittent control for a windshield wiper system in accordance with claim 1 further including switch means having three positions, a first of said positions for deenergizing said motor, the second of said positions for connecting said second motor terminal to said source of said second potential bypassing said second connecting means, and the third of said positions for enabling the operation of said second path connecting means.

12. An intermittent control for a windshield wiper system in accordance with claim 11 further including means operative when said switch means is moved from said first position to said third position for momentarily providing an alternate path from said second motor terminal to said source of said second potential.

* * * * *